United States Patent
Simoens et al.

(10) Patent No.: US 10,158,388 B2
(45) Date of Patent: Dec. 18, 2018

(54) RECEIVER DEVICE AND METHOD FOR NON-LINEAR CHANNEL COMPENSATION

(71) Applicant: NEWTEC CY, Sint-Niklaas (BE)

(72) Inventors: Frederik Simoens, Balegem (BE); Daniel Delaruelle, Sint-Niklaas (BE)

(73) Assignee: NEWTEC CY, Sint-Niklaas (BE)

(*) Notice: Subject to any disclaimer, the term of this patent is extended or adjusted under 35 U.S.C. 154(b) by 36 days.

(21) Appl. No.: 15/320,838

(22) PCT Filed: Jun. 26, 2015

(86) PCT No.: PCT/EP2015/064565
§ 371 (c)(1),
(2) Date: Dec. 21, 2016

(87) PCT Pub. No.: WO2015/197835
PCT Pub. Date: Dec. 30, 2015

(65) Prior Publication Data
US 2017/0163299 A1    Jun. 8, 2017

(30) Foreign Application Priority Data
Jun. 27, 2014    (NL) ..................................... 2013087

(51) Int. Cl.
*H04J 3/17*        (2006.01)
*H04B 1/10*       (2006.01)
(Continued)

(52) U.S. Cl.
CPC ............. *H04B 1/1027* (2013.01); *H04B 1/12* (2013.01); *H04B 1/126* (2013.01);
(Continued)

(58) Field of Classification Search
CPC .... H04B 1/1027; H04B 7/18513; H04B 1/12; H04B 1/126; H04B 2001/1045;
(Continued)

(56) References Cited

U.S. PATENT DOCUMENTS 7,242,725 B2 *   7/2007   Matsumoto ............ H04B 1/123
                                                                     375/254
7,263,144 B2     8/2007   Sasson et al.
(Continued)

OTHER PUBLICATIONS

Netherlands Search Report for corresponding Netherlands Application No. 2013087, dated Mar. 30, 2015.
(Continued)

*Primary Examiner* — Phuc H Tran
(74) *Attorney, Agent, or Firm* — Workman Nydegger

(57) ABSTRACT

A receiver device for a communication system is arranged for receiving a signal comprising a plurality of transponder signals each containing a plurality of carrier signals and comprises: an adjustable spectral filter configurable for selecting a desired transponder signal. Means for performing a non-linear transformation on the selected desired transponder signal, whereby the non-linear transformation is represented by a set of parameter values. At least one receive filter configurable to select at least one desired carrier signal of the non-linearly transformed selected desired transponder signal and, performance measuring means for determining one or more performance metrics on at least one carrier signal of the plurality of carrier signals contained in the desired transponder signal to obtain the set of parameter values.

16 Claims, 4 Drawing Sheets

(51) Int. Cl.
  *H04B 1/12*   (2006.01)
  *H04B 7/185*  (2006.01)
  *H04L 1/00*   (2006.01)
  *H04W 24/08*  (2009.01)
  *H04W 72/08*  (2009.01)
  *H04L 27/38*  (2006.01)
(52) U.S. Cl.
  CPC ......... *H04B 7/18513* (2013.01); *H04L 1/005* (2013.01); *H04W 24/08* (2013.01); *H04W 72/082* (2013.01); *H04B 2001/1045* (2013.01); *H04L 27/3845* (2013.01)
(58) Field of Classification Search
  CPC .... H04W 72/082; H04W 24/08; H04L 1/005; H04L 27/3845
  See application file for complete search history.

(56) References Cited

U.S. PATENT DOCUMENTS

| | | |
|---|---|---|
| 8,331,511 B2 | 12/2012 | Beidas et al. |
| 2003/0016741 A1 | 1/2003 | Sasson et al. |
| 2010/0183106 A1* | 7/2010 | Beidas ................... H04B 1/126 375/350 |

OTHER PUBLICATIONS

International Search Report for corresponding International PCT Application No. PCT/EP2015/064565, dated Aug. 3, 2015.

* cited by examiner

RECEIVER DEVICE AND METHOD FOR NON-LINEAR CHANNEL COMPENSATION

FIELD OF THE INVENTION

The present invention is generally related to the field of techniques for reducing signal distortion in a digital communication system. More in particular, it relates to receiver compensation techniques to reduce distortion introduced by a non-linear communication channel.

BACKGROUND OF THE INVENTION

The present invention is concerned with reducing the distortion on one or more modulated signals (also called modulated carriers) that have been transmitted over a non-linear channel. An example of such a channel is a satellite communication channel.

In a satellite communication system the ground station amplifier and/or satellite amplifier are typically operated close to their saturation points, in order to optimally exploit the available power resources. The amplifier, operated in its non-linear region, distorts the signal (this type of distortion is referred to as self-distortion) and causes frequency regrowth, i.e., it increases the bandwidth of the signal after the amplifier beyond the bandwidth occupied by the signal before the amplifier.

Further, in order to optimally exploit the available bandwidth resources, different modulated carriers are typically placed close to each other in the frequency domain, with little or no frequency spacing between the carriers (referred to as guard bands). Due to the non-linear nature of the channel, these carriers interfere with each other. The distortion caused by this interference is referred to as intermodulation.

Summarizing, a modulated carrier suffers from two forms of distortion: self-distortion (distortion of its own signal) and intermodulation (interference from other modulated carriers), due to non-linear amplification of its own signal and of other modulated carriers, respectively. When modulated carriers suffer from self-distortion and intermodulation, the reliability of the communication will be reduced.

A typical satellite communication configuration is shown in FIG. 1. The satellite communication system 100 includes a transmit segment 110, a satellite segment 130 and a receive segment 160. The transmit segment comprises one or more transmitters, typically called modulators. The modulators in the transmit segment 110 can be collocated, but are often geographically separated. A modulator 111 transmits a modulated carrier 121 towards a satellite. The modulated carrier exhibits a certain bandwidth by carrying a modulated signal, which is typically protected by an error-correcting code. A transmission format can for example be, but is not limited to, DVB-S, DVB-S2 or DVB-S2X. Other carriers, transmitted by other modulators are typically placed next to the carrier 121.

A typical uplink spectrum is shown in 120. A person skilled in the art will understand that it is also possible to transmit carriers with partially or completely overlapping bandwidths. For instance, in a bidirectional link one can put the forward and return carrier in the same bandwidth. In this example the receiver can then subtract its own (known) carrier from the received signal, before demodulating the desired (unknown) carrier.

The uplink signal 120 arrives at the satellite input stage. The satellite contains one or more transponders 130. A transponder contains an input multiplexing (IMUX) filter 131, a travelling waveform amplifier (TWTA) 132 and an output multiplexing (OMUX) filter 133. A transponder contains other components as well, such as up- and down-converters, but these are less relevant to the present invention and therefore omitted in FIG. 1.

Due to the IMUX filter 131, only a limited number of carriers is passed on to the input of the TWTA 132. Hence, a TWTA in a transponder has at its input only part of the complete uplink spectrum. In FIG. 1 carrier 121 passes through the IMUX and appears as carrier 141 in the IMUX output signal 140. The TWTA 132 is typically operated close to its saturation point. As a result of the non-linear behaviour in the TWTA, the TWTA output spectrum 142 is affected by in-band and out-of-band distortion. The latter is referred to as spectral regrowth, which increases the original bandwidth 140. The former is referred to as self-distortion. The OMUX filter 133 removes the spectral components that exceed the bandwidth allocated to the corresponding transponder, such that the output signal spectra of the different transponders are non-overlapping prior to recombination 134. Carrier 141 passes through the OMUX and appears as carrier 151 in the downlink spectrum 150. The useful signal in 151 is affected by self-distortion and intermodulation from neighbouring carriers within the spectrum allocated to its corresponding transponder.

As illustrated in FIG. 1, a state-of-art receiver 160 can be used to receive one particular carrier present in the signal 150. This receiver includes a down-converter 161, a matched filter 162, which filters out a single carrier (e.g. carrier 151) and produce a series of received data symbols. Finally, a decoder 163 aims to retrieve the transmitted information bits from the received data symbols. A person skilled in the art understands that proper synchronization is required prior to decoding, however, for the sake of simplicity this is not shown in the drawing. A state-of-art receiver typically treats the self-distortion and intermodulation as additional noise.

There are a number of approaches possible to control and reduce self-distortion and intermodulation in a satellite communication system. One possibility is to apply predistortion to one or more modulated carriers prior to their transmission, with the purpose of anticipating and reducing the distortion incurred by the carriers from the non-linear channel. Several solutions have been presented in the past that apply signal manipulations in the transmit segment in line with this technique. However, this technique suffers from a number of drawbacks which are listed below. The first drawback is that knowledge of the channel characteristics at the transmitter side is required or must be learned. This knowledge can be absent or inaccurate, reducing the effectiveness of the predistortion. A second drawback is that in case multiple carriers are fed through the same non-linear channel, these carriers must be jointly predistorted. This can only be done if these carriers are transmitted from the same geographical location. However, even in that case, jointly predistorting multiple carriers is known to be a computationally intensive operation.

In another approach self-distortion and intermodulation is reduced by applying a corrective action in the receive segment. Few prior art techniques adopt this strategy. U.S. Pat. No. 7,263,144 and U.S. Pat. No. 7,242,725 describe how to compensate distortion of a single carrier, transmitted over a non-linear channel. The invention disclosed in U.S. Pat. No. 8,331,511 presents a joint non-linear interference cancellation method for multi-carrier transmission. The method allows jointly demodulating and decoding a plurality of carriers, whereby the adjacent channel interference is cancelled between neighboring channels. This approach has several drawbacks. The first drawback is that corrective action is needed for all carriers. For certain scenarios one is only interested in the data of one particular carrier. Furthermore, the modulation parameters employed by the other carriers are not necessarily known to the receiver. A second drawback is that the complexity of this receiver is relatively high. This can be partly mitigated by only canceling interference from directly adjacent carriers. However, this obviously introduces a performance penalty.

Hence, there is a need for a solution with low complexity that allows reducing non-linear distortion at the receiver side.

SUMMARY OF THE INVENTION

It is an object of embodiments of the present invention to provide for a low complexity compensation method and circuit, to reduce the self-distortion and intermodulation that arise when one or more carriers are transmitted over a non-linear channel.

The above objective is accomplished by the solution according to the present invention.

In a first aspect the invention relates to a method for compensating distortion in a receiver of a communication system. The method comprises:

receiving a signal comprising a plurality of transponder signals each containing a plurality of carrier signals, applying the received signal to an adjustable spectral filter, said adjustable spectral filter being configurable to select a desired transponder signal, performing a non-linear transformation on the selected desired transponder signal, whereby the non-linear transformation is represented by a set of parameter values based on one or more performance metrics, applying the non-linearly transformed selected desired transponder signal to at least one receive filter, said at least one receive filter set to select at least one desired carrier signal, whereby the one or more performance metrics are determined on at least one carrier signal of the plurality of carrier signals contained in the desired transponder signal.

The proposed solution indeed allows for reducing self-distortion and intermodulation. A selective spectral filter in the receiver is configured to select a transponder signal of interest. At least the bandwidth and centre frequency of the transponder signal are used to configure the selective spectral filter. The resulting signal still contains a plurality of carrier signals. All these carrier signals have experienced the same non-linearity. Then a non-linear transformation is applied in order to compensate for the non-linear distortion introduced by the channel on this plurality of carrier signals. The applied non-linear transformation can be represented by a set of parameter values. These parameter values are determined by exploiting one or more performance metrics. After the non-linear transformation block a receive filter, preferably a matched filter, is provided, wherein the carrier is selected of which one is interested in the data.

In a preferred embodiment the non-linear transformation is given as a product of a first function operable on the amplitude of the selected desired transponder signal and a second function operable on the phase of the selected desired transponder signal.

In one embodiment the first function operable on the amplitude and the second function operable on the phase are polynomial functions.

In a preferred embodiment the method of the invention also comprises a step of performing a decoding operation on the selected carrier signal. Advantageously the set of parameter values representing the non-linear transformation is determined using a performance metric provided by an error-correcting decoder. In an embodiment the number of iterations required to obtain error-free decoding is minimized in the performance metric provided by the error-correcting decoder.

Alternatively, a weighted sum of the number of unsatisfied parity check nodes at different iterations in the decoding process is minimized in the performance metric provided by the error-correcting decoder.

In another embodiment the signal-to-noise-plus-distortion ratio of the received signal is used as a performance metric.

In yet another embodiment the set of parameter values is selected among a plurality of predefined sets of parameter values.

The adjustable spectral filter is preferably configured by taking into account at least the centre frequency and the bandwidth of the desired transponder signal.

In another embodiment the at least one desired carrier signal on which the one or more performance metrics are determined, overlaps at least in part with one or more other known carrier signals of the plurality of carrier signals of the selected desired transponder signal and a version of the one or more other known carrier signals is subtracted from the at least one desired carrier signal and the outcome of that subtraction is exploited in the one or more performance metrics.

In another aspect the invention relates to a receiver device for a communication system, said receiver device arranged for receiving a signal comprising a plurality of transponder signals each containing a plurality of carrier signals, said receiver device comprising:

an adjustable spectral filter configurable for selecting a desired transponder signal, means for performing a non-linear transformation on said selected desired transponder signal, whereby said non-linear transformation is represented by a set of parameter values, at least one receive filter configurable to select at least one desired carrier signal of the non-linearly transformed selected desired transponder signal, performance measuring means for determining one or more performance metrics on at least one carrier signal of said plurality of carrier signals contained in said desired transponder signal, to obtain said set of parameter values.

In one embodiment the receiver device comprises a decoder unit for decoding the selected at least one desired carrier signal.

In a typical embodiment the receiver device comprises a downconverter arranged for providing an input signal to said adjustable spectral filter.

In another embodiment the performance measuring means is arranged for subtracting from the at least one desired carrier signal on which the one or more performance metrics are determined, a received version of one or more other carrier signals of the plurality of carrier signals of the selected desired transponder signal and for exploiting the outcome of said subtracting in the one or more performance metrics.

The invention also relates to a satellite communication system comprising a receiver device as previously described.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

The above and other aspects of the invention will be apparent from and elucidated with reference to the embodiment(s) described hereinafter.

BRIEF DESCRIPTION OF THE DRAWINGS

The invention will now be described further, by way of example, with reference to the accompanying drawings, wherein like reference numerals refer to like elements in the various figures.

DETAILED DESCRIPTION OF ILLUSTRATIVE EMBODIMENTS

Figure 1:
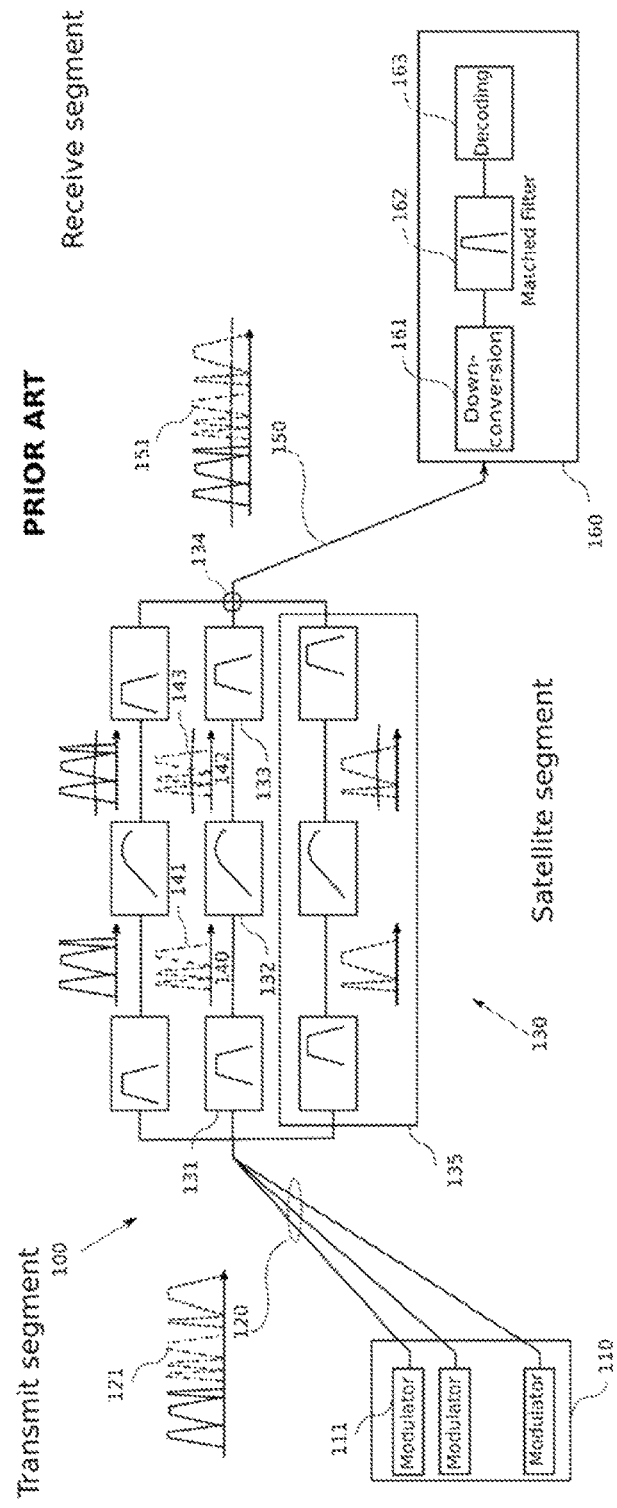
FIG. 1 illustrates a prior art satellite communication system, whereby modulators are used to transmit carriers over one or more satellite transponders. A receiver is used to demodulate and decode one or more carriers.

The present invention will be described with respect to particular embodiments and with reference to certain drawings but the invention is not limited thereto but only by the claims.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

It should be noted that the use of particular terminology when describing certain features or aspects of the invention should not be taken to imply that the terminology is being re-defined herein to be restricted to include any specific characteristics of the features or aspects of the invention with which that terminology is associated.

In the description provided herein, numerous specific details are set forth. However, it is understood that embodiments of the invention may be practiced without these specific details. In other instances, well-known methods, structures and techniques have not been shown in detail in order not to obscure an understanding of this description.

The present invention proposes a post-compensation method to reduce intermodulation and self-distortion at the receiver prior to decoding.

The method of the present invention can be used in a system where one or more (collocated or remote) transmitters communicate over a non-linear channel with one or more receivers. An example of such a system is a satellite communication system, as depicted in FIG. 1 and FIG. 2.

Figure 2:
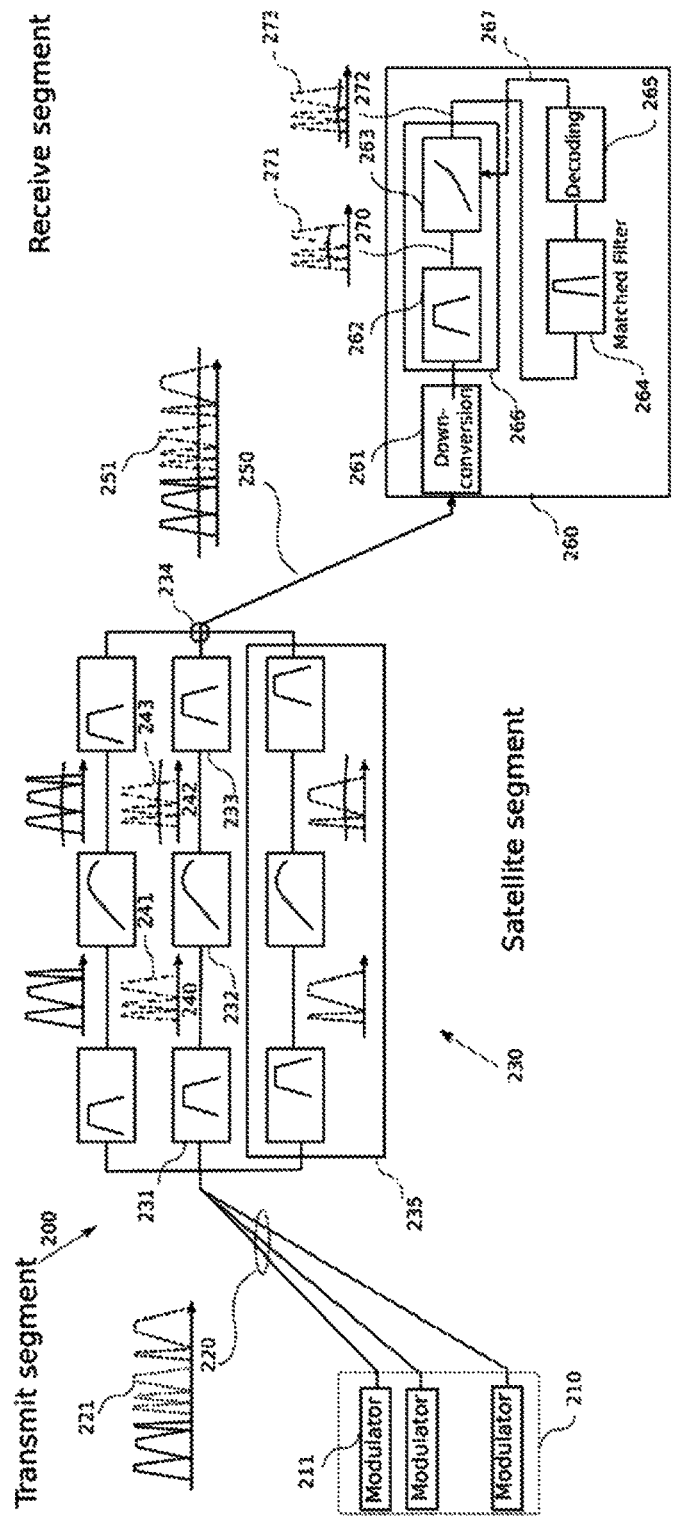
FIG. 2 illustrates a satellite communication system, whereby a receiver exploits the present invention, which allows reducing self-distortion and intermodulation when demodulating and decoding one particular carrier.

FIG. 2 illustrates a satellite communication system 200 adapted for exploiting the proposed post-compensation method. The transmit segment 210 and satellite segment 230 are similar to the transmit segment 110 and satellite segment 130 described in FIG. 1. Note that the transmit segment 210 comprises one or more modulators, which are not necessarily collocated.

FIG. 2 considers an embodiment of a receiver according to the present invention. The receiver 260 aims to recover the data conveyed by only one carrier. This carrier is referred to as the desired carrier. It is labelled with 221 at the transmitter and 251 at the receiver input.

A receiver arranged for exploiting the method of the invention typically includes a downconverter 261, followed by a selective filter 262. The input x(t) of this selective filter can be written as $$x(t) = f_{NL\_A}(s_A(t)) + f_{NL\_B}(s_B(t)) + \ldots + f_{NL\_N}(s_N(t)) + w(t) \qquad (1)$$

where $f_{NL-A}(s_A(t))$ denotes the signal received from a given desired transponder, labelled A. The desired transponder is defined as the transponder carrying the desired carrier, i.e. the carrier carrying data one is interested in. The transmitted signal $s_A(t)$ is amplified by the transponder TWTA. The transponder and downconversion operation can be modelled by a non-linear function $f_{NL-A}(.)$. Note that this function is not necessarily memoryless. Likewise the other terms $f_{NL-B}(s_B(t)), \ldots, f_{NL-N}(s_N(t))$ are the downconverted signals of transponders, other than the desired transponder. The term w(t) denotes additive noise.

The purpose of the selective filter 262 is to suppress all terms in equation (1), except for the term corresponding to the desired transponder. The signal sent over that transponder of interest $s_A(t)$ can contain one or more carriers. One of these carriers is the carrier 221 carrying the data of interest. The selective filter output can be written as $$y(t) = f_{NL-A}(s_A(t)) + \tilde{w}(t) \quad (2)$$

where $\tilde{w}(t)$ denotes the filtered additive noise term. As is apparent from equation (2), the output 270 of this selective filter 262 only contains the carriers which have been transmitted over the same non-linearity 232. Note that this selective filter can be implemented as an analog or a digital filter.

The filter output 270 is fed through a non-linear transformation function, which can be modelled by a non-linear transformation 263. The non-linear transformation function output can be written as $$z(t) = g_{NL}[f_{NL-A}(s_A(t)) + \tilde{w}(t); p_A] \quad (3)$$

where $g_{NL}[.;p_A]$ denotes a non-linear transformation characterized by a finite set of parameters $p_A$. The non-linear transformation function as well as the parameters describing this function are selected in such a way that z(t) represents a good approximation of the original signal $s_A(t)$:

$$s_A(t) \approx g_{NL}[f_{NL-A}(s_A(t)) + \tilde{w}(t); p_A] \quad (4)$$

Note that when the relationship from equation (4) is valid, the self-distortion and intermodulation of the carriers in $s_A(t)$ is reduced. In fact, in case of perfect equality in equation (4), the impairments introduced by the non-linear channel are completely removed.

The output of the non-linear transformation block 263 is fed to a receive filter 264, which is typically matched to a transmit filter or to an equivalent filter obtained by concatenating the transmit filter and elements of the channel. The filter 264 filters out the desired carrier 273 from $s_A(t)$ and produces the received data symbols.

A decoding unit 265 further processes the received data symbols corresponding to the desired carrier. A person skilled in the art understands that proper synchronization and equalization is required prior to decoding, however, for sake of simplicity this is not shown in the drawing.

The non-linear transformation function in equation (3) is applied to the aggregate signal $s_A(t)$, containing all carriers belonging to the desired transponder. The receiver 260 is only interested in receiving the data of only one of these carriers. State-of-the-art receivers not applying the method disclosed in this invention, are typically not aware of the concept of desired transponder. In order to apply the current invention, the bandwidth and centre frequency of the transponder one is interested in, need to be known at the receiver, so that the selective filtering and non-linear transformation function can be applied. However, contrary to other (multi-carrier) post-distortion compensation techniques, this invention does not necessarily require demodulation and decoding of carriers, other than the carrier of interest.

In one embodiment the aggregate signal $s_A(t)$ contains one or more carriers with overlapping bandwidths. One or more of the overlapping carriers are known to the receiver. In this embodiment the receiver subtracts one or more of the known carriers from the output of the non-linear transformation block 263, i.e. z(t). The result can be fed to a receive filter 264, which filters out the desired carrier 273 from $s_A(t)$ and produces the received data symbols. These received data symbols are further processed by decoding unit 265.

In one embodiment the non-linear transformation function $g_{NL}[.;p_A]$ is a complex-valued function that can be written as the product of two functions, operating on the amplitude and angle of the complex-valued input signal $$g_{NL}[y(t);p_A] = h_{NL}[|y(t)|;p'_A] \cdot \exp(j k_{NL}[\vartheta(y(t));p''_A]) \quad (5)$$

where |y(t)| denotes the magnitude of y(t), $h_{NL}[.;p'_A]$ denotes a non-linear function operating on a real-valued input. exp(.) is the exponential function and j the imaginary unit (satisfying $j^2 = -1$). $\vartheta(y(t))$ denotes the argument (also called phase) of y(t). $k_{NL}[.;p''_A]$ is a non-linear function operating on a real-valued input. The functions $h_{NL}[.;p'_A]$ and $k_{NL}[.;p''_A]$ can be described by means of a finite set of parameters. The parameters are used to configure the non-linear transformation (e.g. via a polynomial or non-polynomial function, or via a look-up table).

A preferred way to split up the non-linear transformation function $g_{NL}[.;p_A]$ in a product of a function acting on the amplitude and a function acting on the angle of the complex-valued input signal is the following. The non-linear function $h_{NL}[.;p'_A]$ is written as $$h_{NL}[|y(t)|;p'_A] = p_1 \cdot |y(t)| + p_2 \cdot |y(t)|^2 + p_3 \cdot |Y(t)|^3 \quad (6)$$

where $p'_A = [p_1, p_2, p_3]$ denotes the parameter set describing the function $h_{NL}[.;p'_A]$. Likewise, the non-linear function $k_{NL}[.;p''_A]$ can be written as $$k_{NL}[\vartheta(y(t));p''_A] = p_4 \cdot \vartheta(y(t)) + p_5 \cdot \vartheta(y(t))^2 + p_6 \cdot \vartheta(y(t))^3 \quad (7)$$

where $p''_A = [p_4, p_5, p_6]$ denotes the parameter set describing the function $k_{NL}[.;p''_A]$. The rationale behind the models described in equations (6) and (7) is that they are good approximations of the inverse of certain amplifier models (described by $f_{NL-A}(.)$). As a result, with proper selection of the parameters, it is possible to reduce the self-distortion and intermodulation, by satisfying the relationship described in equation (4).

Alternatively, the non-linear and non-polynomial function $h_{NL}[.;p'_A]$ can be written as $$h_{NL}[|y(t)|;p'_A] = p_1 \cdot |y(t)|^{p_2} + p_3 \cdot |y(t)|^{p_4} \quad (8)$$

Likewise, the non-linear and non-polynomial function $k_{NL}[.;p''_A]$ can be written as $$k_{NL}[\vartheta(y(t));p''_A] = p_5 \cdot \vartheta(y(t))^{p_6} + p_7 \cdot \vartheta(y(t))^{p_8} \quad (9)$$

The exponents $p_2, p_4, p_6, p_8$ are not necessarily integer and may be real-valued. These functions are suitable to compensate for certain amplifier models. Other polynomial or non-polynomial models are suitable to compensate for yet other amplifier models.

In an advantageous embodiment the parameters of the non-linear transformation function $g_{NL}[y(t);p_A]$ are selected in an adaptive manner, based on performance metrics determined by the receiver on one or more carriers.

In one embodiment a decoder performance metric is used to measure the signal quality of the received desired carrier. In case of a linear block code with an iterative decoding strategy, a good metric is the number of required decoding iterations to obtain an error-free reception. Another suitable metric is the number of unsatisfied parity check nodes in a particular decoding iteration (e.g. the last decoding iteration) or a weighted sum of the number of unsatisfied parity check nodes at different iteration stages in the decoding process. One can understand that other similar decoding metrics can be devised, which provide an indication of the received signal quality.

In another embodiment the signal quality of the received carrier of interest is measured with a state-of-art noise and distortion level estimator. This noise and distortion level estimator estimates the thermal noise together with the impairments introduced by the self-distortion and intermodulation, and thus provides a signal-to-noise-plus-distortion metric.

The performance metrics described above drive a feedback loop, which is used to tune the parameters of the non-linear transformation function. The parameters are selected in order to reduce the distortion level as measured by any of the performance metrics mentioned above. This can be done in a calibration phase or continuously via an adaptive parameter tracking. When the non-linear transformation function approximates the inverse of the non-linearity on the satellite, equation (4) will be satisfied, resulting in a reduced self-distortion and intermodulation level, as can be perceived in the spectrum 272.

For certain scenarios the distortion level is minimized if the non-linear transformation is selected by applying one of the methods described above. In an alternative embodiment the parameters can also be chosen such that the non-linear transformation is substantially equal to the inverse of the known non-linear channel. In this case this channel is perfectly or approximately known to the receiver.

For other scenarios the distortion level is minimized if when the non-linear transformation function is not equal to the inverse of the non-linear channel. This is for instance the case on quasi-linear channels. Also note that the inverse of the non-linear channel does not always exist or is not always uniquely defined. This can for instance occur with channels for which the output level is not monotonically increasing with the input level. Tuning the parameters of the non-linear transformation function by means of an adaptive feedback loop is advised in this scenario.

Figure 3:
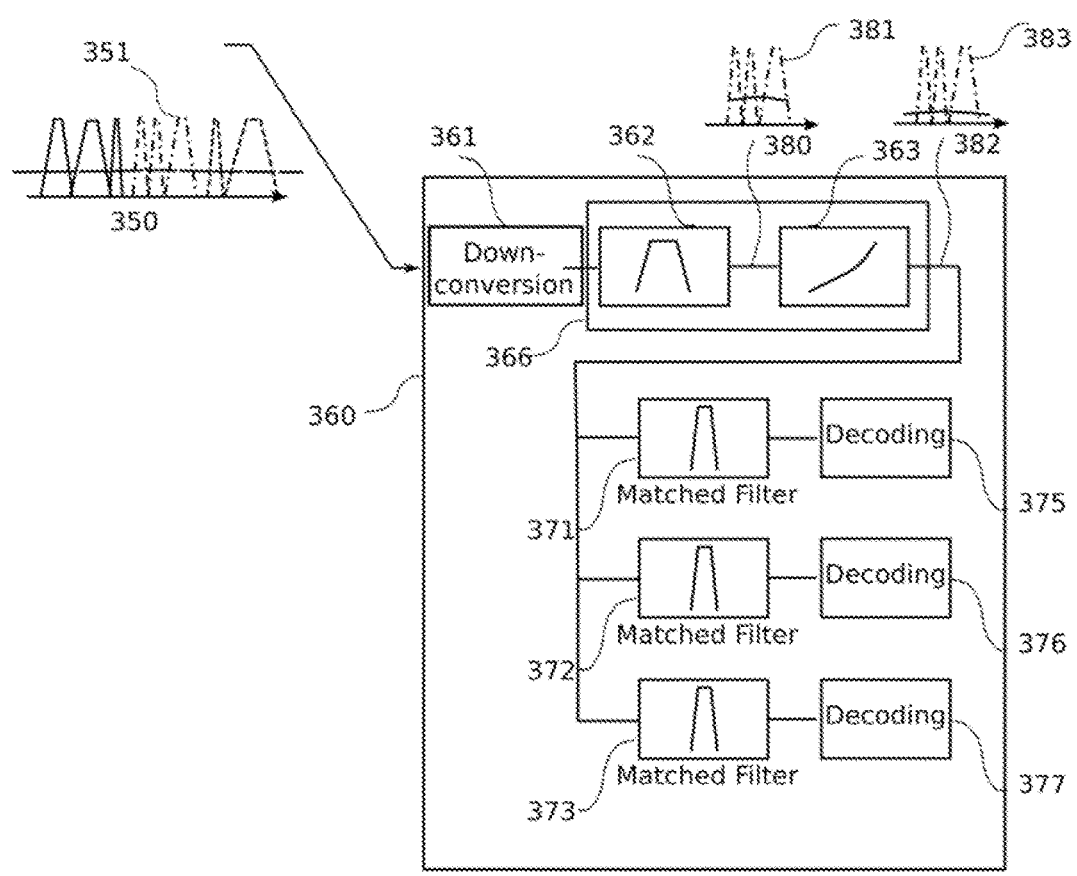
FIG. 3 illustrates a receiver exploiting the present invention, which is used to demodulate and decode multiple carriers.
Figure 4A:
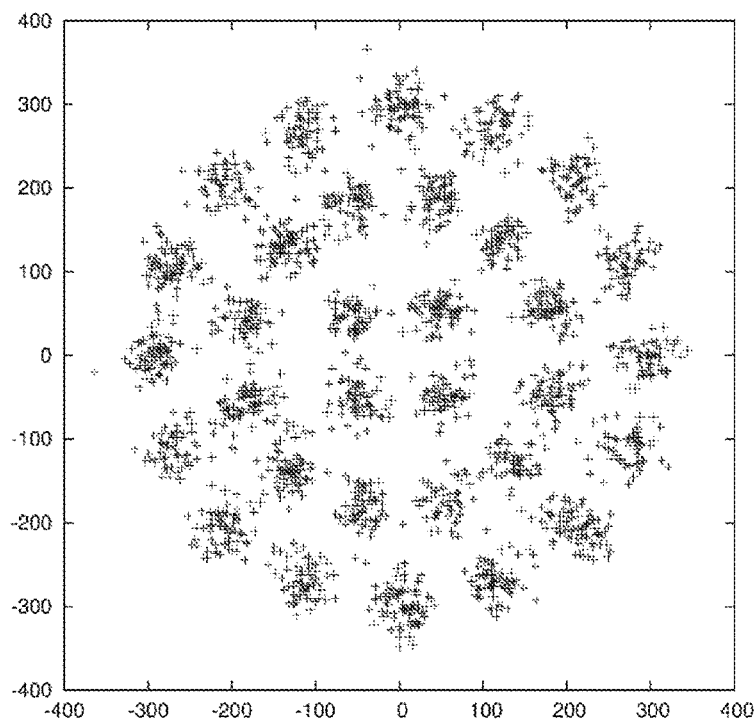
FIG. 4a shows a scatter plot of the received symbols at the input of the decoder in a state-of-art communication system.
Figure 4B:
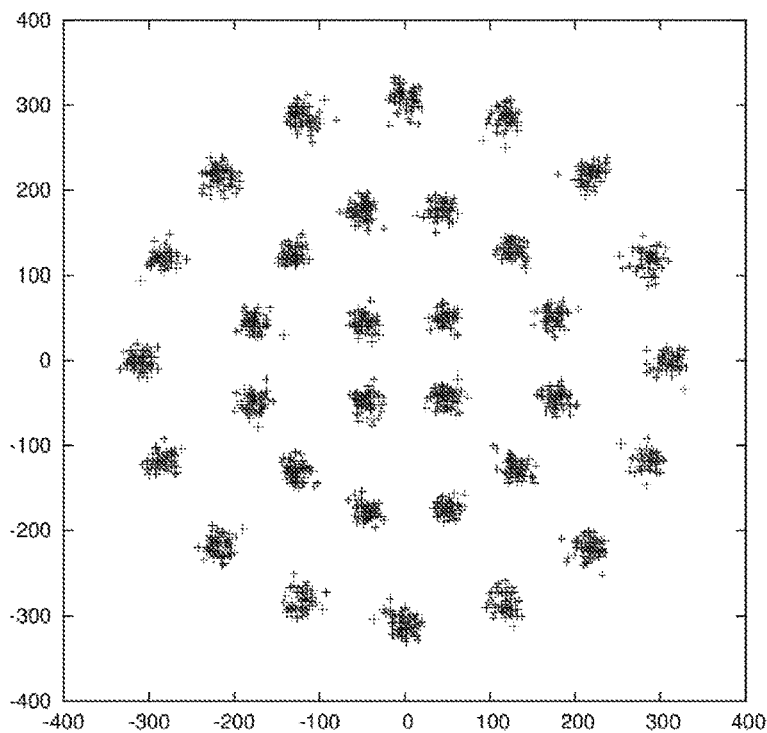
FIG. 4b shows a scatter plot of the received symbols at the input of the decoder when using a receiver that exploits the present invention.

FIG. 3 illustrates another embodiment of the present invention. In this embodiment the receiver has more than one desired carrier, i.e. more than one carrier is demodulated and decoded by a receiver 360. This receiver includes a selective filter 362, a non-linear transformation block 363 and multiple matched filters 371, 372 and 373 and decoders 375, 376 and 377. In this scenario, the non-linear transformation parameters are tuned by combining the performance metrics from one or more receive chains. A good combination comprises optimizing the average of the performance metrics measured on the different received carriers. It is also possible to use the performance metric of the received carrier exhibiting the best performance. It is clear that other combinations of the available performance metrics can be used.

In another embodiment the third order intermodulation product of two or more received carriers (at output of 371, 372 or 373) is computed and correlated with the aggregate signal 382. The level of correlation is used as a performance metric for the intermodulation level present in signal 382.

While the invention has been illustrated and described in detail in the drawings and foregoing description, such illustration and description are to be considered illustrative or exemplary and not restrictive. The foregoing description details certain embodiments of the invention. It will be appreciated, however, that no matter how detailed the foregoing appears in text, the invention may be practiced in many ways. The invention is not limited to the disclosed embodiments.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method for compensating distortion in a receiver of a communication system, the method comprising:
receiving a signal comprising a plurality of transponder signals each containing a plurality of carrier signals,
applying said received signal to an adjustable spectral filter, said adjustable spectral filter configurable to select a desired transponder signal,
performing a non-linear transformation on said selected desired transponder signal, whereby said non-linear transformation is represented by a set of parameter values based on one or more performance metrics,
applying the non-linearly transformed selected desired transponder signal to at least one receive filter, said at least one receive filter set to select at least one desired carrier signal, wherein said one or more performance metrics are determined on at least one carrier signal of said plurality of carrier signals contained in said desired transponder signal.

2. The method for compensating distortion as in claim 1, wherein said non-linear transformation is given as a product of a first function operable on the amplitude of said selected desired transponder signal and a second function operable on the phase of said selected desired transponder signal.

3. The method for compensating distortion as in claim 1, wherein said first function operable on the amplitude and said second function operable on the phase are polynomial functions.

4. The method for compensating distortion as in claim 1, comprising a step of performing a decoding operation on said selected at least one desired carrier signal.

5. The method for compensating distortion as in claim 4, wherein said set of parameter values representing said non-linear transformation is determined using a performance metric provided by an error-correcting decoder.

6. The method for compensating distortion as in claim 5, wherein in said performance metric provided by said error-correcting decoder the number of iterations required to obtain error-free decoding is minimized.

7. The method for compensating distortion as in claim 5, whereby in said performance metric provided by said error-correcting decoder a weighted sum of the number of unsatisfied parity check nodes at different iterations in the decoding process is minimized.

8. The method for compensating distortion as in claim 1, wherein the signal-to-noise-plus-distortion ratio of said received signal is used as a performance metric.

9. The method for compensating distortion as in claim 1, wherein said set of parameter values is selected among a plurality of predefined sets of parameter values.

10. The method for compensating distortion as in claim 1, wherein said adjustable spectral filter is configured taking into account at least the centre frequency and the bandwidth of said desired transponder signal.

11. The method for compensating distortion as in claim 1, wherein said at least one desired carrier signal on which said one or more performance metrics are determined, overlaps at least in part with one or more other known carrier signals of said plurality of carrier signals of said selected desired transponder signal and wherein a received version of said one or more other known carrier signals is subtracted from said at least one desired carrier signal and wherein the outcome of said subtracting is exploited in said one or more performance metrics.

12. A receiver device for a communication system, said receiver device arranged for receiving a signal comprising a plurality of transponder signals each containing a plurality of carrier signals, said receiver device comprising:
- an adjustable spectral filter that selects a desired transponder signal,
- a transformation unit that performs a non-linear transformation on said selected desired transponder signal, whereby said non-linear transformation is represented by a set of parameter values,
- at least one receive filter configurable to select at least one desired carrier signal of the non-linearly transformed selected desired transponder signal,
- a performance measurer that determines one or more performance metrics on at least one carrier signal of said plurality of carrier signals contained in said desired transponder signal, to obtain said set of parameter values.

13. The receiver device as in claim 12, comprising a decoder unit for decoding said selected at least one desired carrier signal.

14. The receiver device as in claim 12, comprising a downconversion mixer arranged for providing an input signal to said adjustable spectral filter.

15. The receiver device as in claim 12, wherein said performance measuring means is arranged for subtracting from said at least one desired carrier signal on which said one or more performance metrics are determined, a received version of one or more other carrier signals of said plurality of carrier signals of said selected desired transponder signal and for exploiting the outcome of said subtracting in said one or more performance metrics.

16. A satellite communication system comprising a receiver device as in claim 12.

* * * * *